ic Office 3,280,084
Patented Oct. 18, 1966

3,280,084
REDUCING COLD FLOW IN CONJUGATED DIENE POLYMERS WITH A POLYVINYL AROMATIC COMPOUND
Robert P. Zelinski and Henry L. Hsieh, Bartlesville, Okla., assignors to Phillips Petroleum Company, a corporation of Delaware
No Drawing. Filed July 16, 1962, Ser. No. 210,210
9 Claims. (Cl. 260—83.7)

This invention relates to an improved method for making conjugated diene polymers. In other aspect it relates to a conjugated diene polymer prepared in the presence of an organolithium initiator and having reduced tendency to cold flow.

Many polymers of conjugated dienes prepared in the presence of an organolithium initiator have a strong tendency to flow in the uncured state. This tendency to cold flow becomes particularly noticeable if the Mooney value of the polymer is below 30 (ML-4 at 212° F.).

Cold flow occurs in these polymers only while they are in the uncured state. It is possible, therefore, to cross link the molecules of the polymers such as is done by conventional curing in order to reduce cold flow. This approach is undesirable where polymers must be later compounded in masticating equipment. The formation of relatively high amounts of gel as a result of cross linking greatly reduces the ease with which the polymers can be mixed with other materials and fabricated. It is highly desirable, therefore, to find a method of reducing the tendency of these conjugated diene polymers to cold flow without the formation of gel.

We have now found that conjugated diene polymers prepared in the presence of an organolithium initiator can be treated in the polymerization mixture in such a way that cold flow of the recovered polymer is substantially reduced and no gel is formed in the polymer to complicate subsequent processing operations. According to our invention this improvement is realized by adding to the polymerization mixture from 0.02 to 1.0 part by weight per 100 parts of polymer of a polyvinyl aromatic compound. The use of this very small amount of the polyvinyl aromatic compound has a significant effect on the cold flow of the polymer but does not produce gel in any amount.

It is an object of our invention to provide an improved method for polymerizing conjugated dienes. Another object of our invention is to provide a method whereby conjugated dienes can be polymerized in the presence of an organolithium initiator so that the product has a reduced tendency to cold flow. Still another object is to provide an improved conjugated diene polymer which has been prepared in the presence of an organolithium initiator and which is gel-free and has very little tendency to flow in the uncured state. Other objects, advantages and features of our invention will be apparent to those skilled in the art from the following discussion.

The polymers which can be prepared according to our invention are broadly the polymers of conjugated dienes, more specifically the hydrocarbon conjugated dienes containing from 4 to 12 carbon atoms per molecule, and preferably those which contain from 4 to 8 carbon atoms per molcule. Examples of these monomers include 1,3-butadiene, isoprene, piperylene, 2,4-dimethyl-1,3-butadiene, 1,3-octadiene, 4,5-diethyl-1,3-octadiene, and the like. These conjugated dienes can be polymerized to form homopolymers or copolymerized one with another. Conjugated diene polymers can also be formed by polymerizing the dienes with one or more copolymerizable mono-vinylidene-containing monomers such as styrene, 2-methyl-styrene, vinylnaphthalene or the like, with the conjugated diene being present in major amount, to form random or block copolymers.

The organolithium initiators can be represented by the formula $RLi_x$ where R is a hydrocarbon radical selected from the group consisting of aliphatic, cycloaliphatic and aromatic radicals containing from 1 to 20 carbon atoms and $x$ is an integer of 1 to 4. Examples of such initiators include methyllithium, n-butyllithium, cyclohexyllithium, 1,4-dilithiobutane, 1,4-dilithio-2-methyl-2-butene, dilithionaphthalene, 1,2-dilithio-1,2-diphenylethane, tetralithionaphthalene, and the like. The organo monolithium compounds are preferred. Polymerizations of this type are well known and are normally carried out in the presence of a diluent which is predominantly hydrocarbon, such as benzene, toluene, n-hexane, isooctane or the like. The amount of initiator used depends upon the desired molecular weight of the polymer but is normally in the range of about 0.25 to 100 millimoles per 100 grams of monomer.

The cold flow of the final product is substantially reduced by incorporating a polyvinyl aromatic compound into the polymerization mixture at any time prior to inactivating the catalyst. This compound is added in an amount ranging from 0.02 to 1 part by weight per 100 parts of monomer, the monomer being the conjugated diene plus any copolymerizable monovinyldiene-containing material. The polyvinyl aromatic compounds can have any one of the following general formulas:

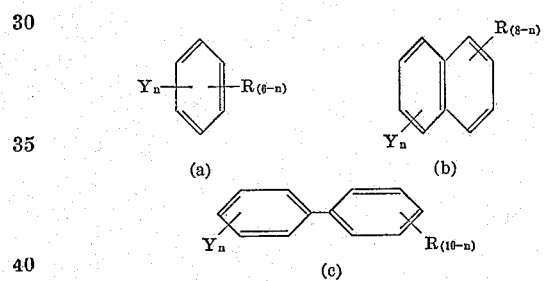

(a)    (b)

(c)

wherein Y is a vinyl group, each R is hydrogen or a lower alkyl with the total of the alkyl substituents containing not more than 12 carbon atoms, and $n$ is 2 or 3. By lower alkyl we mean alkyl groups containing from 1 to 4 carbon atoms. The substituents in the above Formulas (b) and (c) can be on either or both rings. Examples of suitable polyvinyl aromatic compounds include dixinylbenzene, 1,2,4-trivinylbenzene, 1,3-divinylnaphthalene, 1,8-divinylnaphthalene, 1,3,5-trivinylnapthalene, 2,4-divinylbiphenyl, 3,5,4'-trivinylbiphenyl, 1,2-divinyl-3,4-dimethylbenzene, 1,5,6-trivinyl-3,7-diethylnaphthalene, 1,3-divinyl-4,5,8-tributylnaphthalene, 2,2'-divinyl 4-ethyl-4'-propylbiphenyl, and the like. The divinyl aromatic hydrocarbons containing up to 26 carbon atoms are preferred, particularly divinylbenzene in either its ortho, meta, or para isomer. Commercial divinylbenzene which is a mixture of isomers is quite satisfactory.

While only a very small amount of polyvinyl aromatic compound is required, it is desirable to use not more than 1 part by weight per 100 parts of monomer. For best results in obtaining reduced cold flow without production of gel in the polymer, we prefer to use about 0.05 to 0.5 part by weight of the polyvinyl aromatic compounds per 100 parts of monomer. The actual amount used depends upon the initiator level, monomer or the combination of monomers employed.

In many instances the preferred method of operating is to charge all of the monomer and all of the polyvinyl aromatic compound initially. Alternatively from 1 to 10 weight percent of the monomer, a small portion of the diluent and all of the polyvinyl aromatic compound and initiator are charged to the reactor and allowed to react for a period in the range of about 5 minutes to 10 hours. At the end of this time the remainder of the diluent and monomer are added and the polymerization is continued. In still another method of operating the polymerization is initiated in the absence of the polyvinyl aromatic compound which is added later but before the catalyst has been inactivated. We have found that even when the polyvinyl aromatic compound is charged initially with all of the monomer the reaction which has the most significant effect upon cold flow does not take place until substantially all of the conjugated diene has polymerized. There is an advantage in withholding the polyvinyl aromatic compound until after the diene has polymerized since in this way the polymer can be sampled and tested and the amount of polyvinyl aromatic compound controlled to produce a product having a desired Mooney value. The Mooney value of the polymer is increased by increasing the amount of polyvinyl aromatic compound charged.

While the polymerization temperature can vary over a very broad range, for example, from −100 to +300° F., the temperature requirements for the reactions of the polyvinyl aromatic compound are more limited. The time and temperature of the reaction are dependent in that at higher temperatures the reaction is carried out in shorter time. Ordinarily the reaction temperature is in the range of about 85 to 300° F. although temperatures somewhat above or below this range can be used for a portion of the overall reaction. Preferably the temperature is in the range of about 120 to 250° F. and temperatures in the range of about 150 to 250° F. produce very favorable results in a short time. A satisfactory procedure is to carry out the polymerization reaction within the 85 to 300° F. temperature range and to use the same temperature for the reaction of the polyvinyl aromatic compound whether added before, at the beginning or after the polymerization. The period required for the polymerization and for the reaction of the polyvinyl aromatic compound can range anywhere from about 2 minutes to 100 hours or more although the time is ordinarily in the range of about 5 minutes to 10 hours for each step. In operating in the preferred temperature range the time for the reaction beyond that required for the polymerization usually does not exceed about 2 hours. These reaction periods vary to some degree depending upon the amount of polyvinyl aromatic compound charged with the greater amounts reducing the time for the reaction. In order to illustrate the advantages of our invention further the following examples are presented. The conditions and proportions of these examples are typical only and should not be construed to limit the invention unduly.

EXAMPLE I

Butadiene was polymerized in two runs, one with and the other without divinylbenzene. Commercial divinylbenzene was used. This product was a mixture containing 26.2 percent divinylbenzene isomers with the remainder being ethylstyrene and diethylbenzene.

|  | A | B |
|---|---|---|
| Cyclohexane, parts by weight | 780 | 780 |
| 1,3-butadiene, parts by weight | 100 | 98 |
| Divinylbenzene, parts by weight | 0 | [3] 0.5 |
| n-Butyllithium,[1] mhm.[2] | 1.5 | 1.5 |
| Temperature, ° F. | 122 | 122 |
| Time, hours | 5 | 5 |

[1] Obtained as a normal heptane solution; diluted with cyclohexane.
[2] Millimoles per 100 parts monomer.
[3] Two parts of a commercial product containing 26.2 weight percent divinylbenzene was charged.

Cyclohexane was charged first, the reactor was purged with nitrogen, butadiene was added, in run B the divinylbenzene was introduced, and then the butyllithium. Conversion was substantially quantitative in five hours. The reactions were shortstopped with a 10 weight percent solution of 2,2′-methylene-bis(4-methyl-6-tert-butylphenol) in a 50/50 volume mixture of toluene and isopropyl alcohol using sufficient quantity to provide one part by weight of the antioxidant per 100 parts rubber. The polymers were coagulated in isopropyl alcohol and dried in a vacuum oven. Cold flow, Mooney value, inherent viscosity, and gel were determined on each product. Results were as follows:

|  | A | B |
|---|---|---|
| Cold flow, mg./min. | 146.0 | 1.27 |
| ML–4 at 212° F. | 5.5 | 66.0 |
| Inherent viscosity | 1.52 | 2.42 |
| Gel, percent | 0 | 0 |

These data show that the divinylbenzene gave a polymer with greatly reduced cold flow. The Mooney value and inherent viscosity were higher in the divinylbenzene run. Both polymers were gel free.

EXAMPLE II

Variable quantities of divinylbenzene were employed in two series of runs for the polymerization of butadiene. The polymerization recipe was as follows:

| | |
|---|---|
| Cyclohexane, parts by weight | 900 |
| 1,3-butadiene, parts by weight | 100 |
| n-Butyllithium, mhm. | 1.5, 1.7 |
| Divinylbenzene, parts by weight | Variable |
| Temperature, ° F. | 122 |
| Time, hours | 16 |
| Conversion, percent | 100 |

The procedure was the same as in Example I. Results were as follows:

| Run No. | BuLi, mhm. | Divinylbenzene, phm.[1] | Cold Flow, mg./min. | ML–4 at 212° F. |
|---|---|---|---|---|
| 1 | 1.5 | 0.05 | 12.1 | 20.0 |
| 2 | 1.5 | 0.08 | 1.1 | 53.5 |
| 3 | 1.5 | 0.10 | 0.3 | 55.5 |
| 4 | 1.5 | 0.13 | 0.05 | 89.2 |
| 5 | 1.7 | 0.05 | 13.5 | 17.8 |
| 6 | 1.7 | 0.08 | 5.0 | 28.8 |
| 7 | 1.7 | 0.10 | 1.9 | 37.2 |
| 8 | 1.7 | 0.13 | 0.3 | 57.0 |

[1] Parts by weight per 100 parts monomer. Commercial product described in Example I was used.

Run A of Example I shows cold flow and Mooney values obtained when a butadiene polymerization is carried out at a 1.5 mhm. initiator level with no divinylbenzene present. Polybutadiene prepared with a 1.7 mhm. initiator in the absence of divinylbenzene, using the polymerization recipe of this sample, gave a product having a cold flow of 123 mg./min. and a Mooney value of 3.6. These data demonstrate again the effectiveness of divinylbenzene in reducing the cold flow of polybutadiene. The Mooney value was increased, larger values being obtained with increasing amounts of divinyl benzene.

EXAMPLE III

The polymerization of butadiene was carried out in two steps. In the first step a portion of the diluent and butadiene and all the initiator and divinylbenzene were reacted for three hours. The remainder of the cyclohexane and butadiene were added and polymerization continued for 68 more hours. Products were recovered as in the preceding examples. Following are the polymerization recipe for each step and results obtained:

First step:
Cyclohexane, parts by weight _____ 90
1,3-butadiene, parts by weight _____ 5
Divinylbenzene, phm. _____ variable
n-Butyllithium, mhm. _____ 1.5, 1.7
Temperature, ° F. _____ 122
Time, hours _____ 3

Second step:
Cycyohexane, parts by weight _____ 810
1,3-butadiene, parts by weight _____ 95
Temperature, ° F. _____ 122
Time, hours _____ 68
Conversion, percent _____ 100

*Summary of results*

| Run No. | BuLi, mhm. | Divinyl-benzene, phm.[1] | Cold Flow, mg./min. | ML-4 at 212° F. |
|---|---|---|---|---|
| 1 | 1.5 | 0 | 102 | 12.2 |
| 2 | 1.5 | 0.05 | 12 | 26.0 |
| 3 | 1.5 | 0.10 | 0.2 | 84.4 |
| 4 | 1.7 | 0 | 123 | 3.6 |
| 5 | 1.7 | 0.05 | 57 | 10.8 |
| 6 | 1.7 | 0.10 | 0.7 | 39.2 |

[1] Same as in preceding examples.

These results demonstrate again the effect of divinylbenzene in decreasing cold flow and increasing Mooney value of polybutadiene.

EXAMPLE IV

Butadiene was polymerized in the presence of a butyllithium catalyst and divinylbenzene. The following polymerization recipe was used:

Cyclohexane, parts by weight _____ 780
1,3-butadiene, parts by weight _____ 100
n-Butyllithium, mhm. _____ 1.7
Divinylbenzene, parts by weight [1] _____ 0.10
Temperature, ° F. _____ 122
Time, hours _____ 16
Conversion, percent _____ 100

[1] As in preceding examples.

The foregoing polymer (A) and a sample of a commercial polybutadiene (B) prepared in the presence of an organolithium catalyst were compounded and evaluated. Following is a summary of the data:

*Raw rubber properties*

|  | A | B |
|---|---|---|
| ML-4 at 212° F | 42.0 | 35.0 |
| Inherent viscosity | 2.20 | 2.14 |
| Gel, percent | 0 | 0 |
| Cold flow, Glass plate method | 1.94 | 8.01 |

*Compounding recipe, parts by weight*

|  | A | B |
|---|---|---|
| Polymer | 100 | 100 |
| High abrasion furnace black | 50 | 50 |
| Zinc oxide | 3 | 3 |
| Stearic acid | 1 | 1 |
| Resin 731D [1] | 5 | 5 |
| Philrich 5 [2] | 5 | 5 |
| Flexamine [3] | 1 | 1 |
| Sulfur | 1.75 | 1.75 |
| NOBS Special [4] | 1.1 | 1.1 |

[1] Disproportionated pale rosin stable to heat and light.
[2] Highly aromatic oil.
[3] A physical mixture containing 65 percent of a complex diarylamine-ketone reaction product and 35 percent of N,N'-diphenyl-p-phenylene diamine.
[4] N-oxydiethylene-2-benzothiazyl sulfenamide.

*Processing properties*

|  | A | B |
|---|---|---|
| Compounded Mooney (MS-1½ at 212° F.) | 49 | 47 |
| Extrusion Data at 250° F.: |  |  |
| In./min | 46.5 | 61.3 |
| G./min | 114.0 | 106.0 |
| Rating (Garvey Die) | 9− | 8+ |

The above data show that a polymer having improved cold flow characteristics can be made according to this invention without sacrificing processability. The polymer of the invention and the commercial polybutadiene had very similar physical properties after being compounded and cured.

EXAMPLE V

Butadiene and styrene were copolymerized with n-butyllithium in cyclohexane as the solvent. In the absence of a polar material a block copolymer would form, so tetrahydrofuran was added to induce random copolymerization. The cyclohexane was charged first and the reactor was purged with nitrogen. Then the butadiene was added, the styrene and the tetrahydrofuran. In some of the runs divinylbenzene was thus added in the form previously described, and finally the iniator. The reaction time was 3 hours in the runs not using divinylbenzene and 5 hours in those that did. Conversion in all runs was 100 percent. Temperature was 122° F. The recipe was as follows:

Parts by weight
1,3-butadiene _____ 75
Styrene _____ 25
Cyclohexane _____ 1000
Tetrahydrofuran _____ 1.5
n-butyllithium _____ variable
Divinylbenzene _____ variable The cold flow properties and viscosities of the polymers are shown in the table below:

| Run No. | Butyl lithium, mhm. | Divinyl benzene, phm. | Inherent Viscosity | Mooney ML-4 at 212° F. | Cold Flow, mg./min. |
|---|---|---|---|---|---|
| 1 | 1.1 | 0 | 2.23 | 110 | 2.2 |
| 2 | 1.2 | 0 | 1.75 | 52 | 6.1 |
| 3 | 1.4 | 0 | 1.58 | 32 | 9.4 |
| 4 | 1.5 | 0 | 1.30 | 14 | 21.5 |
| 5 | 1.6 | 0 | 1.13 | 9 | 19.8 |
| 6 | 1.8 | 0 | 1.06 | 6 | 22.6 |
| 7 | 1.4 | 0.05 | 2.23 | 50 | 0 |
| 8 | 1.5 | 0.05 | 1.72 | 47 | 0.6 |
| 9 | 1.6 | 0.05 | 1.48 | 30 | 2.6 |
| 10 | 1.8 | 0.05 | 1.41 | 25 | 4.5 |
| 11 | 2.0 | 0.05 | 1.19 | 13 | 13.0 |
| 12 | 1.4 | 0.1 | 3.72 | 145 | 0 |
| 13 | 1.5 | 0.1 | 2.28 | 98 | 0 |
| 14 | 1.6 | 0.1 | 2.09 | 71 | 0 |
| 15 | 1.8 | 0.1 | 1.69 | 44 | 0.4 |
| 16 | 2.0 | 0.1 | 1.43 | 27 | 1.8 |
| 17 | 1.8 | 0.16 | 2.42 | 108 | 0 |
| 18 | 2.0 | 0.16 | 1.78 | 49 | 0.3 |

The above data show that by regulation of the amounts of initiator and divinylbenzene used a polymer of relatively low inherent viscosity or Mooney value but with very little or no tendency to cold flow can be obtained.

In the above data standard rubber testing procedures were used to determine processing and physical properties. Mooney viscosities were determined by the method ASTM D–927–57T. Inherent viscosity was determined by placing 0.1 gram of polymer in a wire cage in 100 milliliters of toluene and allowing the polymer to stand at about 25° C. for 24 hours. The cake was then removed and the solution filtered. The solution was then passed through a Medalia-type viscometer at 25° C., the viscometer having been calibrated with toluene. Inherent viscosity is calculated by dividing the natural logarithm of the relative viscosity by the weight of the original sample. The relative viscosity is the ratio of the viscosity of the polymer solution to that of toluene.

Cold flow, unless otherwise indicated, was measured by extruding the polymer through a ¼ inch orifice at 3.5 p.s.i. pressure and a temperature of 122° F. After allowing 10 minutes to reach steady state, the rate of extrusion was measured and the values recorded in milligrams per minute. In the glass plate method of determining cold flow, four cylinders, 0.450 x 0.450 inch, were cut from a compression molded slab of rubber and placed erect between two 3 x 4 inch glass plates averaging 26–27 grams in weight. The cylinders were positioned at the corners of 1.5 x 2 inch rectangle in the center of the plates and the sandwich thus assembled was weighted with a 3 x 4 inch lead plate weighing 160 grams. After standing 18 hours at 80° F. the weight was removed and the increased area of contact between the cylinders and the top plate was measured. The cold flow recorded is the ratio of the final to the initial area of contact between the rubber cylinders and glass plate.

As will be apparent to those skilled in the art, from the above discussion, various modifications can be made in our invention without departing from the spirit or scope thereof.

We claim:

1. In a process for making a conjugated diene polymer in the presence of a hydrocarbon lithium initiator, the method of reducing the tendency of the polymer to cold flow without producing gel which comprises adding to the polymerization mixture from about 0.02 to 1.0 part by weight per 100 parts of monomer of a polyvinyl aromatic compound, and holding the resulting mixture after completion of polymerization of the conjugated diene hydrocarbon for five minutes to ten hours at a temperature in the range of 85 to 300° F.

2. In a process for making a conjugated diene polymer by polymerizing a conjugated diene hydrocarbon having from 4–8 carbon atoms per molecule in the presence of a hydrocarbon lithium initiator having the formula $RLi_x$ wherein R is selected from the group of aliphatic, cycloaliphatic and aromatic hydrocarbon radicals containing from 1 to 20 carbon atoms and $x$ is an integer of 1 to 4, the method of reducing the cold flow of the polymer without producing gel which comprises adding to the polymerization mixture from 0.02 to 1.0 part by weight per 100 parts of monomer of a polyvinyl aromatic compound having the general formula selected from the group consisting of:

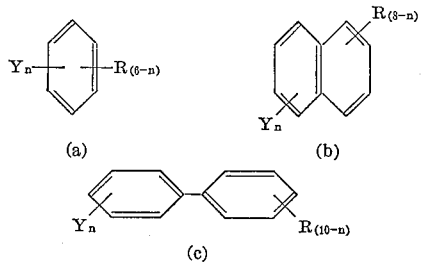

wherein Y is a vinyl radical, each R is selected from the group consisting of hydrogen and lower alkyls with the total of said R groups containing up to 12 carbon atoms and $n$ is an integer of 2 to 3, and holding the resulting mixture after completion of polymerization of the conjugated diene hydrocarbon for five minutes to ten hours at a temperature in the range of 85 to 300° F.

3. The method of claim 2 wherein said conjugated diene is 1,3-butadiene and said polyvinyl aromatic compound is divinylbenzene.

4. The method of claim 2 wherein said conjugated diene polymer is a random copolymer of butadiene and styrene.

5. The method of claim 2 wherein said conjugated diene polymer is a block copolymer of butadiene and styrene.

6. In a process for making a conjugated diene polymer wherein a conjugated diene hydrocarbon having from 4 to 8 carbon atoms per molecule is polymerized in the presence of a hydrocarbon monolithium initiator, the method of reducing the tendency of the polymer to cold flow without producing gel which comprises initiating the reaction by contacting the initiator with from 1 to 10 weight percent of the monomer and from 0.05 to 0.5 part by weight of divinyl aromatic hydrocarbon per 100 parts of total monomer ultimately charged, after a period in the range of about 5 minutes to 10 hours charging the remainder of the monomer to the polymerization mixture, and holding the resulting mixture after completion of polymerization of the conjugated diene hydrocarbon for five minutes to ten hours at a temperature in the range of 85 to 300° F.

7. In a process for making a conjugated diene polymer wherein a conjugated diene hydrocarbon containing 4–8 carbon atoms per molecule is polymerized in the presence of a hydrocarbon monolithium initiator, the method of reducing the tendency of the polymer to cold flow without forming gel which comprises mixing together initially the initiator, the monomer and from 0.05 to 0.5 part by weight per 100 parts of monomer of a divinyl aromatic hydrocarbon containing up to 20 carbon atoms, and holding the resulting mixture after completion of polymerization of the conjugated diene hydrocarbon for five minutes to ten hours at a temperature in the range of 85 to 300° F.

8. In a process for making a conjugated diene polymer wherein conjugated diene hydrocarbon containing 4 to 8 carbon atoms per molecule is polymerized in the presence of a hydrocarbon monolithium initiator containing from 1 to 20 carbon atoms, the method of reducing the tendency of the polymer to cold flow without forming gel which comprises adding to the polymerization mixture after substantially all the monomer has polymerized and before terminating the reaction from 0.05 to 0.5 part by weight per 100 parts of monomer of a divinyl aromatic hydrocarbon, and holding the resulting mixture for 5 minutes to 10 hours at a temperature in the range of 85 to 300° F.

9. A method of reducing the tendency of polybutadiene to cold flow wherein the polymer is formed by polymerizing 1,3-butadiene in the presence of n-butyllithium, the improvement comprising adding to the polymerization mixture after said butadiene has polymerized but before termination of the reaction from 0.05 to 0.5 part by weight of divinylbenzene per 100 parts of butadiene and continuing the reaction for 5 minutes to 10 hours at a temperature in the range of 120 to 250° F.

References Cited by the Examiner

UNITED STATES PATENTS

| | | | |
|---|---|---|---|
| 2,815,335 | 12/1957 | Welch | 260—80.5 |
| 2,847,406 | 8/1958 | Legge | 260—83.7 |
| 2,975,160 | 3/1961 | Zelinski | 260—83.7 |

JOSEPH L. SCHOFER, *Primary Examiner.*

LEON J. BERCOVITZ, *Examiner.*

C. R. REAP, H. I. CANTOR, *Assistant Examiners.*